United States Patent [19]

Stern et al.

[11] Patent Number: 4,967,370
[45] Date of Patent: Oct. 30, 1990

[54] ROBOT AND SENSOR ERROR DETERMINATION SYSTEM

[75] Inventors: Howard K. Stern, Greenlawn; Samson L. Schmuter, New York, both of N.Y.

[73] Assignee: Robotic Vision Systems, Inc., New York, N.Y.

[21] Appl. No.: 260,862

[22] Filed: Oct. 21, 1988

[51] Int. Cl.$^5$ ............................................. G05B 19/00
[52] U.S. Cl. ...................................... 364/513; 901/46
[58] Field of Search .............. 364/513, 474.34, 474.35, 364/474.37, 192, 571.05, 571.02, 571.01; 901/46, 47; 318/568.22, 632

[56] References Cited

U.S. PATENT DOCUMENTS

| | | | |
|---|---|---|---|
| 4,642,781 | 2/1987 | Szonyi | 364/513 |
| 4,722,063 | 1/1988 | Yasukawa et al. | 364/192 |
| 4,725,965 | 2/1988 | Keenan | 364/513 |
| 4,753,569 | 6/1988 | Pryor | 364/559 |
| 4,796,195 | 1/1989 | Haggerty | 364/474.35 |
| 4,815,006 | 3/1989 | Andersson et al. | 364/513 |
| 4,841,762 | 6/1989 | Hunter | 364/571.01 |

Primary Examiner—Allen MacDonald
Attorney, Agent, or Firm—Max Fogiel

[57] ABSTRACT

A method for measuring the position and orientation changes of a 3-D sensor relative to a robot mount and for measuring the positioning and orienting changes of the robot mount. All measurements reveal changes relative to a baseline measurement. A novel reference provides a low-cost measurement aid. A reference object is placed within the work volume of the robot carrying the sensor which is capable of making three-dimensional measurements. The reference object has a shape that enables unambiguous determination of its location and orientation. The reference object is measured from predetermined orientations, and the measurements are recorded in a memory. These measurements form a baseline measurement set. The measurement step is repeated at a later time, and another measurement set is produced. The baseline measurement set and the other measurement set are processed to determine robot positioning errors and sensor location errors.

10 Claims, 8 Drawing Sheets

ROBOT AND SENSOR ERROR DETERMINATION SYSTEM

BACKGROUND OF THE INVENTION

In the application of machine vision to robot manufacturing processes it has become known that there is a need to rapidly determine the accuracy of the vision data. The vision data is used to guide the robot to alter its programmed path to accommodate inaccuracies caused by the robot and inaccuracies in the workpieces upon which the robot must operate. The knowledge of the accuracy of the location of measuring apparatus (whether vision or otherwise) relative to the process tooling is therefore essential to determining accurate corrections to be applied to the robot end effector position and orientation.

Since the measuring device, a vision sensor in the case to be described, will ordinarily be separate from the tool performing an operation on a workpiece, the position of the tool relative to the measuring device affects the location to which the tool will be guided unless the measuring device directly measures the tool position relative to the workpiece position. For many applications, the sensor is mounted on the end of the robot arm along with the process tool. The tool is not measured by the sensor but rather it is assumed to remain in a fixed location relative to the sensor so that changes in workpiece location measured by the sensor can be used to infer the corrections needed to properly position the tool.

If the robot introduces a positioning error, then the sensor measurement of that error can be applied directly to the robot to reposition both the sensor and tool to the correct location relative to the workpiece. If, however, the sensor has been moved relative to the tool such as might be caused by striking an obstruction, then the sensor's error should be applied to the sensor's data prior to its use for guiding the robot. Alternatively, the measurement of either type of error could be used by the robot operator to enter corrective adjustments to the robot or reposition the sensor as appropriate.

Positioning errors have six degrees of freedom: translation in two directions orthogonal to each other in the horizontal plane; translation vertically; and rotation about each of those three directions. It becomes a difficult task for a robot operator to make corrections that are not presented to him in a form that can be directly applied. For example, the system should compute the amount and direction that the sensor must be moved to correct a measured error, if it is determined that the error is caused by the sensor.

SUMMARY OF THE INVENTION

It is an object of the present invention to provide a method for the rapid determination of positional changes, reflected in sensor measurements relative to the time of initial robot path generation, that are caused by the robot or by the sensor.

In keeping with this object and with still others which will become apparent as the description proceeds, the important characteristics of the invention are the automatic recording of initial conditions; relatively low cost and a simple device required to enable error determination; the ability to separate the error causes into robot and sensor categories; the ability to separate these catagories further into their error components; and the automatically generated instructions to the robot operator to correct the setup.

The method consists of providing a physical reference that can be readily measured by a sensor mounted on the robot arm. The reference is placed in a location that does not interfere with the manufacturing process and enables the best separation of error variables. The robot is instructed to present the sensor to the reference at a preferred attitude. The sensor is then made to measure the fixture and the results stored for future use as a reference representing an unchanged condition. This reference should be taken at the time of work path generation to eliminate as many variables as possible. Then, at any future time the system may be checked for variation by repeating the measurement of the fixture by the sensor, and comparing the measurements to the recorded reference measurements. Any deviations greater than specified acceptable tolerances would alert the robot operator to the need to make corrections.

The principle involved that enables the automatic determination of the source of the error is that multiple measurements of the reference fixture are made at different sensor orientations. In a preferred method the sensor is rotated about an axis aligned to the fixture and the symmetry of the measurements provides the necessary information to distinguish robot induced errors from sensor position induced errors. If the robot has moved, the scene will appear to uniformly shift or tilt. If the sensor has been moved relative to the rotation axis, the measurements will appear to shift by different amounts when viewed from different directions.

A method for obtaining increased angular sensitivity requires the use of additional measurements from different orientations and/or reference fixtures.

The invention will hereafter be described with reference to an exemplary embodiment, as illustrated in the drawings. However, it is to be understood that this embodiment is illustrated and described for the purpose of information only, and that nothing therein is to be considered limiting of any aspect of the invention.

BRIEF DESCRIPTION OF THE DRAWINGS

FIG. 9b shows a side view of the same fixture in FIG. 9a;

DESCRIPTION OF THE PREFERRED EMBODIMENT

Figure 1:
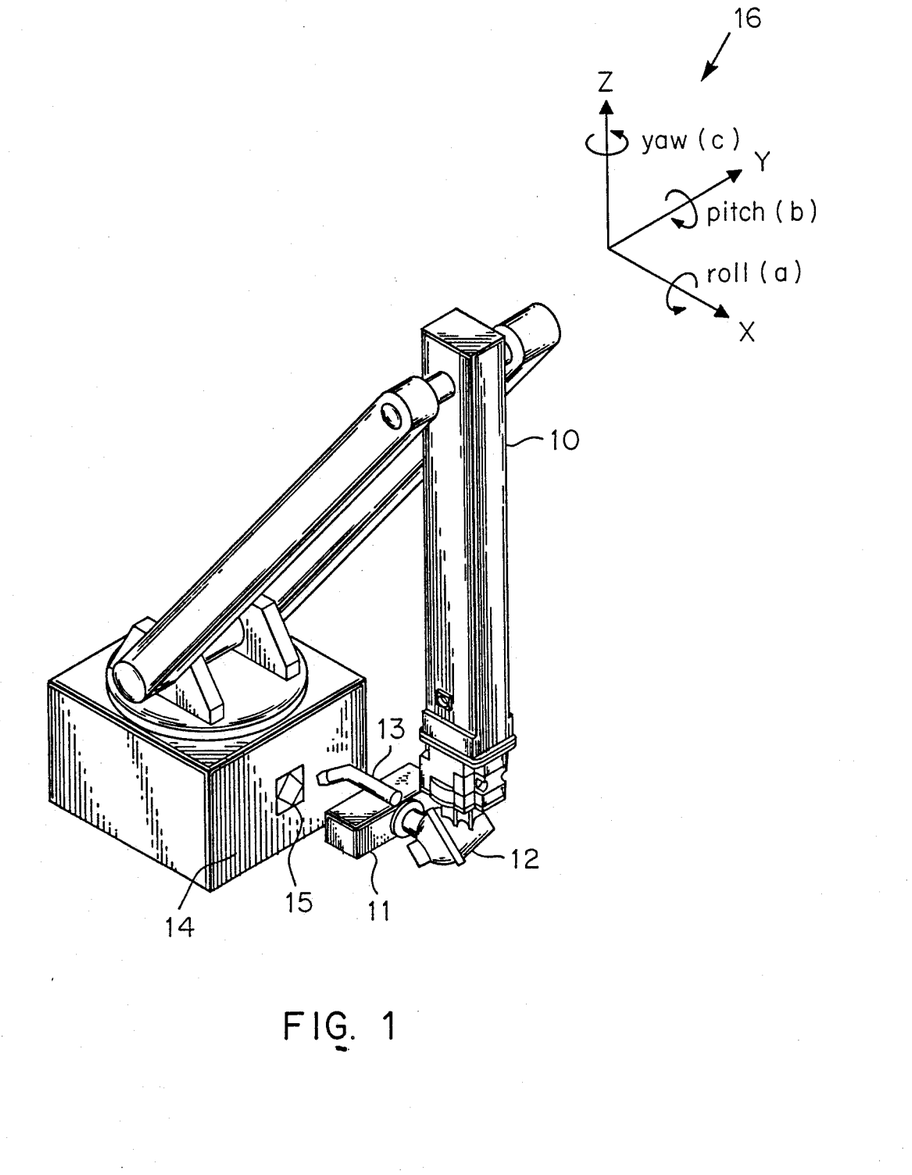
FIG. 1 is a perspective view and illustrates a robot with a vision sensor and welding torch poised to measure a reference fixture.

FIG. 1 shows an articulated arm robot 10 with a vision sensor 11 mounted on the robot wrist 12. A tool such as a welding torch 13 is also mounted on wrist 12. In operation, robot 10 is programmed to move torch 13 along a path on a workpiece and sensor 11 measures a significant feature on the workpiece, such as a seam to be welded, to establish a baseline condition. As subsequent workpieces arrive to be welded, robot 10 carries sensor 11 along the taught path to measure the seam. The measurements tell if the seam is of the same size shape and location as the baseline condition. Any deviation can be used to cause a modification of the taught path so that as robot 10 carries torch 13 along the seam, torch 13 will be placed correctly relative to the seam, compensating for manufacturing tolerances in the workpiece. All directions will be given in accord with coordinate system 16.

For this system of robot guidance to function properly, the measurements made by sensor 11 must reflect the position and orientation of torch 13. If either is moved relative to their common mount 12, then the system will perform incorrectly. The present invention addresses a method for determining if sensor 11 has moved relative to wrist mount 12 as compared to the baseline condition. The invention also addresses errors that occur as a result of changes within the robot 10 positioning system (such as realignment errors) as compared to the baseline condition since such errors may not be properly cancelled. For example, vision sensors using a single plane of light cannot sense rotation about an axis formed by the intersection of the light plane with a flat surface. This could lead to a false interpretation of the data.

A reference object 15 can be placed in a location that doesn't interfere with the workpiece, such as on the side 14 of the robot 10 pedestal. A properly constructed reference object can provide a high sensitivity to change in the sensor location and orientation. For example, a sphere provides information about three degrees of freedom—translation in any of three mutually orthogonal directions—but provides no orientation information because of its complete rotational symmetry in all directions. A square shaped object such as 15 provides the three translational degrees of freedom information and three rotational degrees of freedom information. Although a square has rotational ambiguity in 90 degree increments, errors of less than 45 degrees are of interest here so that no ambiguity will be present. For larger angles of uncertainty greater asymmetry is required.

Figure 2A:
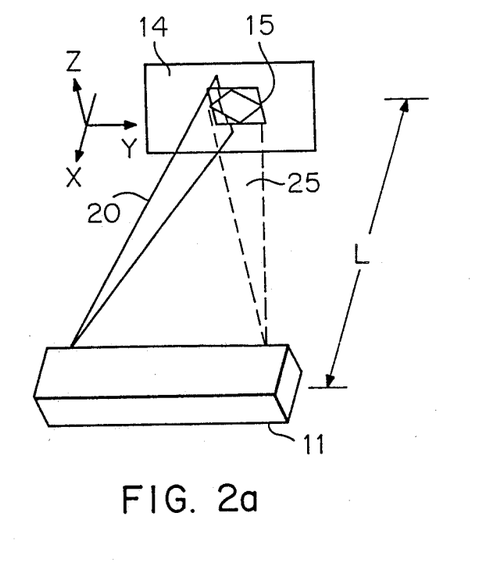
FIG. 2a shows an enlarged view of the sensor and reference.
Figure 2B:
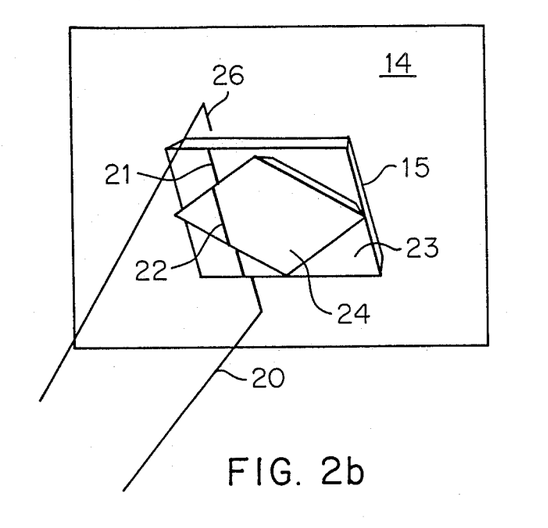
FIG. 2b provides a detail view of the reference fixture with the protected plane of light.

An enlarged view of sensor 11 and reference object 15 is shown in FIG. 2a where the view is from above with torch 13 and the robot wrist removed for clarity. Sensor 11 is assumed to be an optical triangulation type which projects a light plane 20 upon surfaces 23 and 24 (shown in enlarged section FIG. 2b) of object 15 and mounting surface 14. A camera mounted within sensor 11 at the opposite end of the sensor from the light projector views the light reflected from light plane 20 that falls within its view volume 25 whose edges are shown dashed in FIG. 2a. Light plane 20 intersects mounting surface 14 along line 26, surface 23 along line 21, and surface 24 along line 22. Sensor 11 via associated electronics interprets the reflected light line segments recorded by the sensor camera as three dimensional coordinates relative to the position of sensor 11. The angle of projection, angle of viewing, and the distance separating the camera and projector provide the basis for triangulation enabling the computation of the measurements. The sensor 11 is rotationally mounted on the robot wrist 12 (FIG. 1).

Figure 3A:
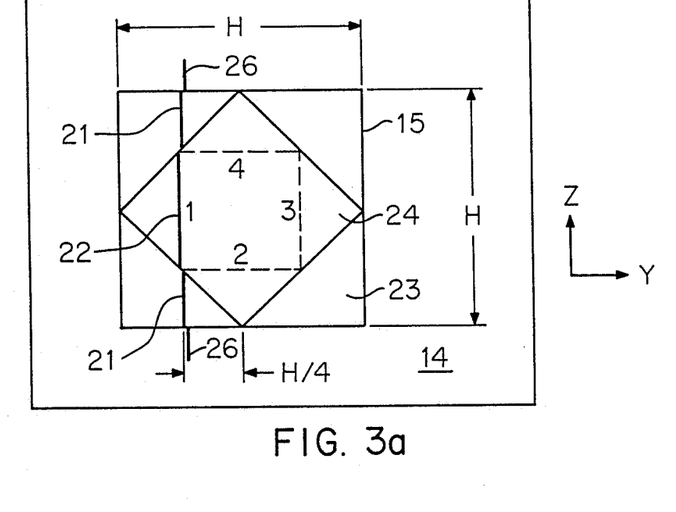
FIG. 3a shows the nominal light pattern on the reference fixture as a front view.
Figure 3B:
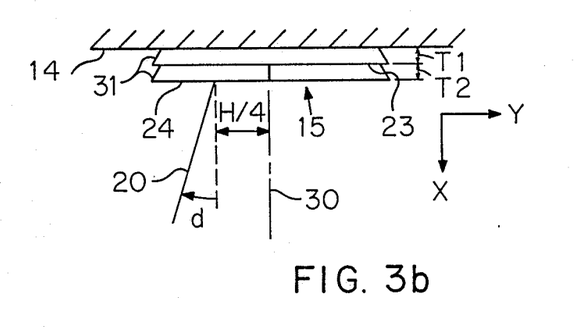
FIG. 3b shows the fixture as a top view with the incident light plane.

FIG. 3a shows a face on view of reference object 15 with height and width dimensions H. FIG. 3b shows a top view of object 15 with light plane 20 intersecting surface 24 at an approximate angle d. The center line 30 of sensor 11 rotation is placed near the center of object 15. Sensor 11 is positioned at a distance that causes plane 20 to intersect surface 24 at a distance of about H/4 from the center of object 15, forming line segment 22. Object 15 is mounted on surface 14. Surface 23 is located a distance T1 in front of surface 14, and surface 24 is positioned a distance T2 in front of surface 23. The angle d of plane 20 causes line segments 21 and 26 formed by the intersection of plane 20 and surfaces 23 and 14 to fall to the right (more +y direction) of line segment 22. Sides 31 may be sloped as shown toward the fixture center to avoid reflecting light when the sensor is slightly tilted.

Dimension H should be selected to be smaller than the height (z dimension) of light plane 20 to accommodate movement vertically of plane 20 without losing complete intersection with object 15. Distances T1 and T2 need only be large enough to provide easy identification of line segments 21, 22, 26. Center line 30 of the sensor 11 rotation is aligned approximately perpendicular to surface 24. It may be preferable to supply surface 14 as a part of reference object 15 to avoid relying on the uncontrolled characteristics of the mounting surface. Surface 14 would have to be sufficiently large to fill the view of the camera in sensor 11 for all anticipated error motion.

Figure 4:
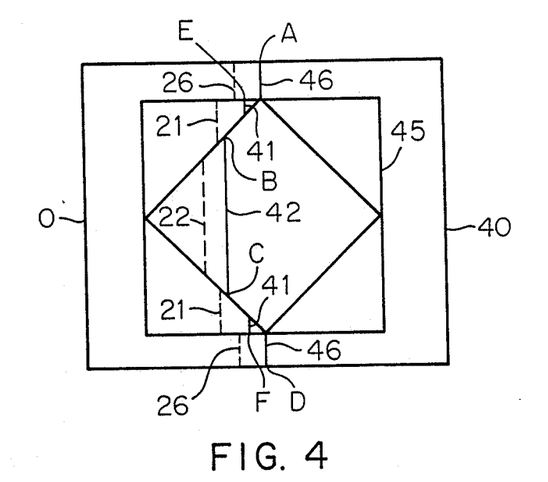
FIG. 4 shows the light pattern as seen by the sensor camera when shifted $+\Delta x$.

FIG. 4 shows object 15 as seen by the camera within sensor 11. Line segments 21. 22. 26 are shown dashed in the locations for a baseline condition. They provide measurements against which comparisons of new measurements will be made to determine if any changes have occurred. For example, if the sensor is moved away from surface 14 in the +x direction, light plane 20 will intersect object 15 and surface 14 to the right (+y direction) of the baseline condition. The line segments 21, 22, 26 will be as shown by solid line segments 41, 42, 46 respectively. Since the positions of the segments 22, 42, 21, 41 have changed, a means is provided for determining that the sensor 11 is not in the same position as when the baseline condition was recorded. We will define a parameter U=(OE+OB+OC+OF)/4 that is sensitive to this change. The measurements B, C, E, F made within the boundaries O, A, D of camera view 40 are used to define the segment lengths.

FIG. 5 again shows the camera's view 50 of object 15, now shown as dashed image 555 in its baseline location. Illustrated by solid lines 55 is the image of object 15 When the sensor 11 is moved to the right (+y direction). The object 15 appears to move to the left, but as long as the surfaces of object 15 are parallel to the y direction, the intersection of light plane 20 with object 15 and surface 14 will not move left or right. The intersections are shown as 51, 52 and 56. We define a second parameter P=(AB+CD)/2 that is sensitive to this shift of sensor position. The length of segment 52 increases as the sensor moves to the right, causing parameter P to decrease.

Figure 5:
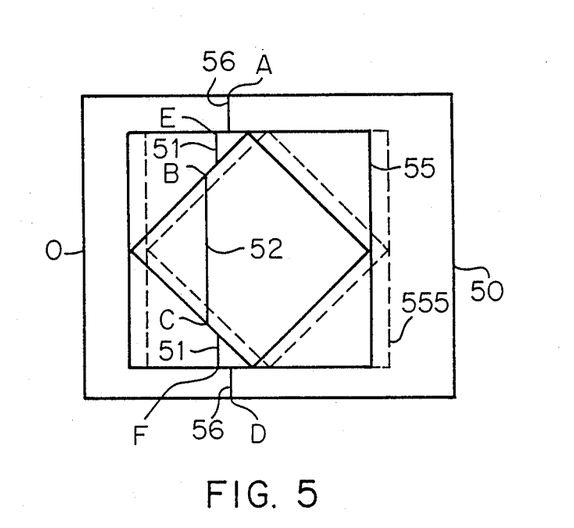
FIG. 5 shows the light pattern as seen by the sensor camera when shifted $+\Delta y$ or rotated by $-\Delta c$.

Since pivoting plane of light 20 about an axis parallel to the z axis at a distance L from surface 14 will appear very similar to a movement in the y direction for small angles (a negative c angular rotation is similar to a +y direction movement of the sensor), FIG. 5 also represents a condition of a small negative yaw of the sensor 11.

Figure 6:
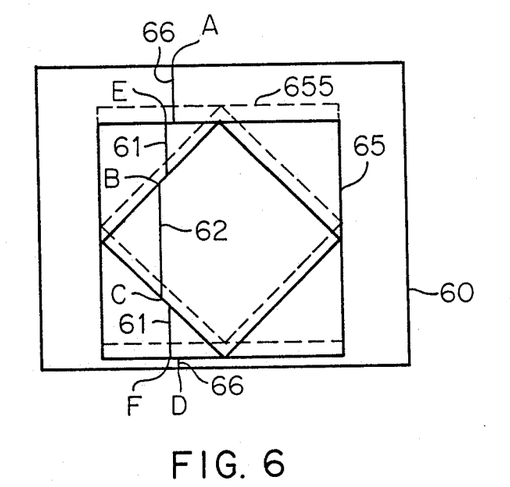
FIG. 6 shows the light pattern as seen by the sensor camera when shifted $+\Delta z$.

FIG. 6 shows the camera's view 60 of object 15, shown as dashed image 655 in the baseline condition. Shown by solid lines 65 is the object 15 when sensor 11 is moved up (the +z direction). The object 15 appears to move down and the intersection of light plane 20 with object 15 and surface 14 produces line segments 61, 62, 66 that do not move left or right from the baseline condition when the surfaces are parallel to the z direction. A parameter Q=(AB−CD)/2 can be defined that is sensitive to the line segment changes caused by movement in the z direction.

Figure 7:
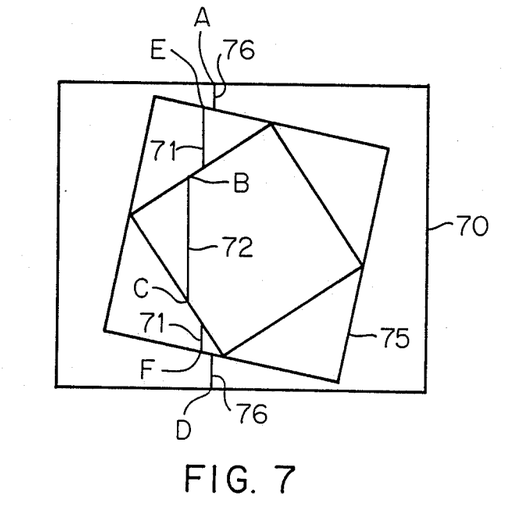
FIG. 7 shows the light pattern as seen by the sensor camera when rotated $+\Delta a$.

FIG. 7 shows the camera's view 70 of object 15 (shown as 75) after a rotation of the sensor 11 counter clockwise (a roll of +a angle) around the center line (x axis) of the sensor from the baseline condition (not shown). As long as the surfaces of object 15 and surface 14 are perpendicular to the x axis, the intersection of plane 20 with surfaces shown as line segments 71, 72, 76 will not move left or right. A parameter R=CF−BE can be defined that is sensitive to the measurement of the line segment terminal points B, C, E, F that vary as a function of a.

Figure 8:
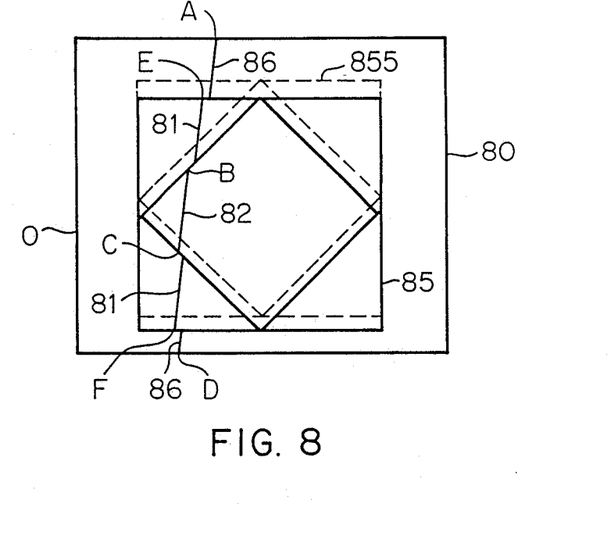
FIG. 8 shows the light pattern as seen by the sensor camera when rotated $+\Delta b$.

FIG. 8 shows the camera's view 80 of object 15 shown as dashed image 855 in its baseline location. When sensor 11 is rotated upward about an axis a distance L from surface 14 and parallel to the y axis (the +b direction shown in FIG. 1), the image of object 15 appears to move downward as shown by solid image 85. The intersection of plane 20 with the object 15 and surface 14 appears to rotate since the distance at the top of the view becomes greater than L, and the distance at the bottom of view 80 becomes less than L. The intersections of plane 20 and the surfaces produce line segments 81, 82, 86 from which we can define a parameter V=(OA−OD)/AD. This parameter is sensitive to rotation b using measurements of the line segment 86 at view 80 boundaries A and D with respect to boundary 0.

Since object 15 is rotationally symmetric in 90 degree increments when viewed perpendicular to its surface, we can rotate sensor 11 90, 180 or 270 degrees about an axis through the center of object 15, perpendicular to surface 24 and obtain measurements that appear very similar to the measurements at 0 degrees. The line segment 22 of the surface 24 and plane 20 intersection would be in the position indicated in FIG. 3a for the roll angle =0 degrees. That location is labeled 1. At a roll of 90, 180 or 270 degrees (CCW) segment 22 would be at location 2, 3 and 4, respectively, as shown by dashed lines. We shall now show that this set of four measurements is sufficient to derive information concerning any change in the robot wrist 12 position relative to the baseline condition, and any change in the sensor 11 position relative to wrist 12 from the time the baseline measurements were made.

The four measurement sets are made at the baseline time and recorded. At any future time the measurements are repeated and the changes in the parameters U, P, Q, R and V are used as follows to determine the magnitude and direction of any changes in:

x—a shift of sensor 11 and wrist 12 in the x direction
$y_R$—a shift of wrist 12 in the y direction
$y_S$—a shift of sensor 11 in the y direction relative to wrist 12
$z_R$—a shift of wrist 12 in the z direction
$z_S$—a shift of sensor 11 in the z direction relative to wrist 12
a—a roll of sensor 11 and wrist 12 around an axis parallel to the x axis through the center of object 15 (radians)
$b_R$—a pitch of wrist 12 about an axis parallel to the y axis at a distance L from surface 14 (radians)
$b_S$—a pitch of sensor 11 relative to wrist 12 about the same axis as $b_R$ (radians)
$c_R$—a yaw of wrist 12 about an axis parallel to the z axis at a distance L from the surface 14 (radians)
$c_S$—a yaw of sensor 11 relative to wrist 12 about the same axis as $c_R$ (radians)

Roll Angle =0 degrees (location 1 in FIG. 3a)
parameter P=(AB+CD)/2

FIGS. 4–8 directly represent all degrees of freedom of the sensor 11 and wrist 12 since the coordinate systems are chosen to be in alignment at roll =0. Parameter P depends on AB+CD=AD−BC. Since AD is a constant formed by the camera boundaries we need only select movements that affect the length BC. Also, we will simplify the equations by assuming small angular errors and ignore movements producing small contributions. With these assumptions we get no change in length BC from a Z movement as shown in FIG. 6, and we will ignore the change caused by rotations a and b shown in FIGS. 7 and 8. The major changes come from a y or x motion or a c rotation. We will designate Pb as the baseline measurement and P as the subsequent measurement. We obtain:

$$P-P_b = -y_R - y_S - k_{xp}x + k_{cp}(c_R + c_S)$$

where
$k_{xp}$=tan d
$k_{cp}=L-T1-T2$

A scaling factor to relate inches of motion to distances in the camera view has been omitted for clarity. The signs have been chosen to maintain distances AB and CD as positive. For roll angle =180 degrees (location 3) we note that the direction of $Y_s$ reverses but produces the same effect since the measurements are made relative to the sensor's coordinate system. The robot motion $y_R$, however, is effectively reversed as is the robot yaw $c_R$. The yaw of the sensor 11, $c_S$, and motion in the x direction produce the same effects as before:

$$P-P_b = +y_R - y_S - k_{xp}x + k_{cp}(-c_R + c_S)$$

For roll angle =90 degrees (location 2) we see that $y_s$ is in the $z_R$ direction and $y_R$ no longer produces a change in P. Now $z_R$ affects P, and $-b_R$ replaces $c_R$ in affecting P. Thus, $$P-P_b = -z_R - y_S - k_{xp}x + k_{cp}(-b_R + c_S)$$

For roll angle =270 degrees (location 4), we see that the effect of $z_R$ and $b_R$ are reversed:

$$P - P_b = z_R - y_S - k_{xp}x + k_{cp}(b_R + c_S)$$

Roll angle =0 degrees (location 1) Parameter
U=(OE+OB+OC+OF)/4

Parameter U is a measure of the average distance of line segments 21, 22, 26 from the left edge 0 of the camera field of view. We see in FIG. 4 that movement in the x direction directly affects U. Yaw of sensor 11 will cause light plane 20 to move in the x direction, since the intersection is nominally H/4 off center and the central distance L describes an arc as the sensor yaws. Likewise pitch will cause motion in the x direction, some of which averages to zero leaving a small residual. Motions in the Y and z directions and roll ideally produce no motion in the x direction and can be ignored. The small yaw and pitch terms can be ordinarily ignored as well. Accordingly, $$U - U_b = k_{xu}[x + k_{cu}(c_R + c_S)^2 + k_{cu}(b_R + b_S)^2 + k_{au}(c_R + c_S)] \simeq k_{xu}x$$

where $k_{xu} = \tan d$
$k_{cu} = (L - T_1 - T_2/2)/2$
$k_{au} = H/4$
$U_b$ is the baseline measurement For roll angle =180 degrees (location 3) the errors introduced by the robot yaw and pitch are reversed:

$$U - U_b = k_{xu}[x + k_{cu}(-c_R + c_S)^2 + k_{cu}(-b_R + b_S)^2 + k_{au}(-c_R + c_S)] \simeq k_{xu}x$$

For roll angle =90 degrees (location 2) $-b_R$ acts like $c_R$ at 0 degrees and $c_R$ acts like $b_R$ at 0 degrees, yielding:

$$U - U_b = k_{xu}[x + k_{cu}(-b_R + c_S)^2 + k_{cu}(c_R + b_S)^2 + k_{au}(-b_R + c_S)] \simeq k_{xu}x$$

For roll angle =270 degrees (location 4) the signs of $b_R$ and $c_R$ are the reverse of at 90 degrees:

$$U - U_b = k_{xu}[x + k_{cu}(b_R + b_S)^2 + k_{cu}(-c_R + b_S)^2 + k_{au}(b_R + c_S)] \simeq k_{xu}x$$

Roll angle =0 degrees (location 1) Parameter
Q=(AB−CD)/2

Parameter Q is a measure of motion of sensor 11 in the z direction relative to object 15. Ideally motion in the x and y directions produce no change in Q. Q is also sensitive to the pitch of sensor 11, but not yaw. Q is not too sensitive to roll so we will ignore its contribution for the small angles of error we need to detect.

$$Q - Q_b \simeq z_R + z_S + k_{bq}(b_R + b_S) - k_{br}(b_R + b_S) \simeq$$
$$z_R + z_S + k_{bq}(b_R + b_S) \text{ since } k_{br} << k_{bq} \text{ usually,}$$

where $k_{bq} = k_{cp} = L - T_1 - T_2$ and $Q_b$ is the baseline measurement $k_{br} = (H/2) \tan d$ For roll angle =180 degrees (location 3) the $z_R$ and $b_R$ errors introduced by the robot reverse direction:

$$Q - Q_b \simeq -z_R + z_S + k_{bq}(-b_R + b_S) - k_{br}(-b_R + b_S) \simeq$$
$$-z_R + z_S - k_{bq}(-b_R + b_S)$$

For roll angle =90 degrees (location 2) $c_R$ and $y_R$ give errors similar to $b_R$ and $z_R$, respectively, at 0 degrees roll. Therefore, we obtain:

$$Q - Q_b \simeq -y_R + z_S + k_{bq}(c_R + b_S) - k_{br}(-c_R + b_S) \simeq$$
$$-y_R + z_S + k_{bq}(c_R + b_S)$$

For roll angle =270 degrees (location 4) the errors due to $c_R$ and $y_R$ reverse from that at roll =90 degrees, yielding:

$$Q - Q_b \simeq y_R + z_S + k_{bq}(-c_R + b_S) - k_{br}(-c_R + b_S) \simeq$$
$$y_R + z_S + k_{bq}(-c_R + b_S)$$

Roll angle =0 degrees (location 1) Parameter
R=CF−BE

Parameter R is a measure of motion of sensor 11 around the x axis (roll) relative to object 15. Ideally, motion in the x, y, z directions or yaw around the z axis produces no change in R. Hence, $$R - R_b = -k_{ar}(a) + k_{br}(b_R + b_S)$$

where
$k_{ar} = H/2$
$k_{br} = (H/2) \tan d$
$R_b$ = the baseline measurement

For roll angle =180 degrees (location 3) the effect of robot angle $b_R$ is reversed. We therefore obtain, $$R - R_b = -k_{ar}(a) + k_{br}(-b_R + b_S).$$

For roll angle =90 degrees (location 2) $c_R$ produces the effect that was produced by $b_R$ at roll=zero degrees. Therefore, $$R - R_b = -k_{ar}(a) + k_{br}(c_R + b_S).$$

For roll angle =270 degrees (location 4) $-c_R$ produces the effect that was produced by $b_R$ at roll=zero degrees.

Thus, we obtain, $$R - R_b = -k_{ar}(a) + k_{br}(-c_R + b_S).$$

Roll angle =0 degrees (location 1) Parameter
V=(OA−OD)/AD

Parameter V is a measure of the pitch of sensor 11 relative to object 15. Ideally, motion of the sensor in x, y, z directions and roll or yaw of the sensor do not effect V. We obtain, $$V - V_b = k_{bv}(b_R + b_S)$$

where
$k_{bv} = AD \tan d$
$V_b$ = the baseline measurement.

For roll angle =180 degrees (location 3) the error introduced by the robot pitch reverses direction:

$$V - V_b = k_{bv}(-b_R + b_S)$$

For roll angle =90 degrees (location 2) $c_R$ gives the error that $b_R$ gives at a roll of 0 degrees:

$$V - V_b = k_{bv}(c_R + b_S)$$

For roll angle =270 degrees (location 4) the error introduced by the robot yaw reverses direction relative to 90 degrees roll:

$$V - V_b = k_{bv}(-c_R + b_S)$$

Determination of Errors

The parameters P, Q, U, R and V, that we have defined are functions of the robot variables yR, zR, bR, cR; sensor variables ys, zs, bs, cs; and the common variables x and a. We can, therefore, solve the equations for the values of the variables of interest:

$$x = \left(\sum_{i=1}^{4} (U - U_b)_i/(4\ k_{xu})\right) \quad \begin{array}{l} i = 1, 2, 3, 4, \text{ for roll } = \\ 0, 90, 180, 270 \text{ degrees} \\ \text{respectively} \end{array}$$

$$b_R = [(V - V_b)_1 - (V - V_b)_3]/(2\ k_{bv})$$

$$b_S = \left[\sum_{i=1}^{4} (V - V_b)_i\right]/(4\ k_{bv})$$

$$c_R = [(V - V_b)_2 - (V - V_b)_4]/(2\ k_{bv})$$

$$a = -\left(\sum_{i=1}^{4} (R - R_b)_i - 4\ k_{br}\ b_s\right)/(4\ k_{ar})$$

$$y_R = -[(P - P_b)_1 - (P - P_b)_3 + (Q - Q_b)_2 - (Q - Q_b)_4 - 2(k_{cp} + k_{bq})\ c_R]$$

$$y_S - k_{cp}\ c_S = -\left(\sum_{i=1}^{4} (P - P_b)_i + 4\ k_{xp}x\right)/4$$

$$z_R = -[(P - P_b)_2 - (P - P_b)_4 - (Q - Q_b)_1 + (Q - Q_b)_3]/4$$

$$z_S = \left(\sum_{i=1}^{4} (Q - Q_b)_i - 4\ k_{bq}\ b_S\right)/4$$

We see that six of the errors ($b_r$, $b_s$, $c_R$, $y_R$, $z_R$, $z_S$) can be separated. Additionally it is possible to separate $y_s$ and $c_s$ by defining a parameter sensitive to $c_s$ employing the distance $T_1 + T_2$. The magnitude of the a and x parameters are determined, though not separated into robot and sensor components. This enables us to provide nearly complete instructions to the robot operator on where the errors come from and in terms that can be used to make the needed corrections.

A single measurement of the sensor 11, relative to the wrist 12 using conventional mechanical means, can determine $a_s$ and $x_s$ from which we can obtain $a_R$ and $x_R$ from $a = a_R + a_s$ and $x = x_R + x_s$.

Figure 9A:
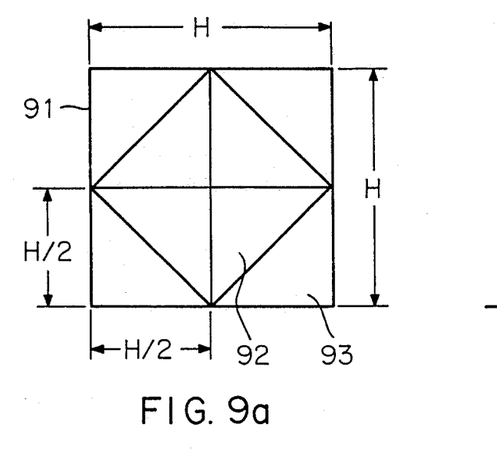
FIG. 9a shows a top view of an alternative reference fixture.
Figure 9B:
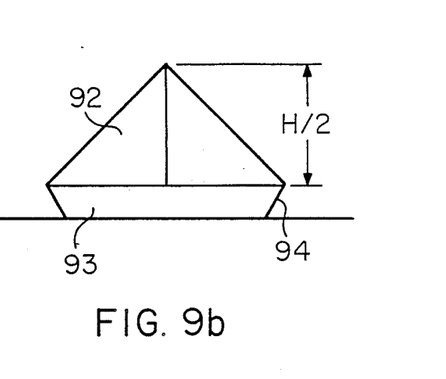

FIG. 9 illustrates an alternate reference object 91 consisting of a four-sided pyramid 92 mounted on a square base 93. The sides 94 of base 93 are preferably tapered inward as shown to reduce light reflection from light directed at the object from angles slightly off the vertical. The similarity of shape of object 91 to object 15 enables the development of a similar set of equations from which the sensor 11 and robot 10 errors can be separately determined. The sloping surfaces of pyramid 92 provide position information in analagous manner to the diagonal edges of surface 24 on object 15 Base 93 is used in on analagous way as surface 23 of object 15.

Figure 10A:
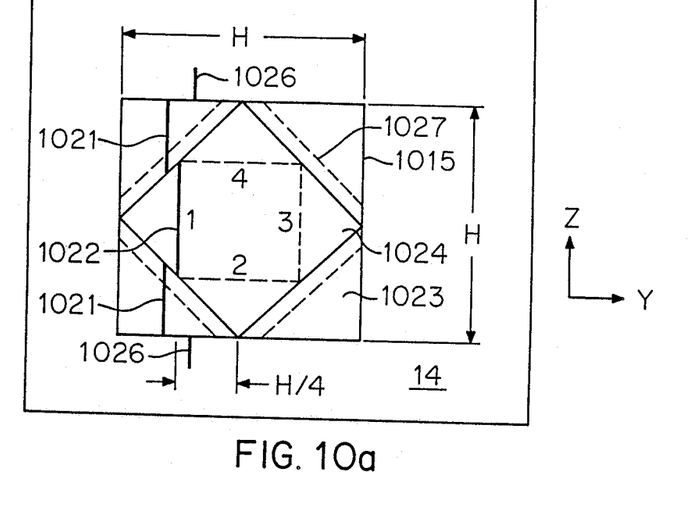
FIG. 10a shows the nominal light pattern on a cavity type reference fixture as a front view.
Figure 10B:
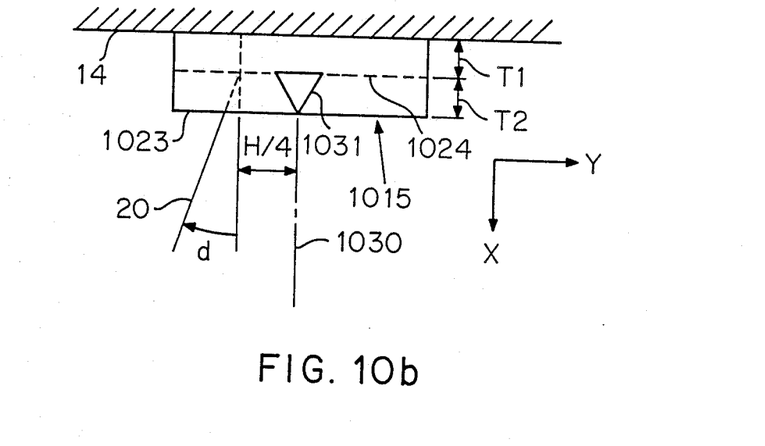
FIG. 10b shows the cavity fixture as a top view with the incident light plane.

FIG. 10 illustrates an alternate implementation of the reference fixture of FIG. 3. Instead of protruding outward, surface 1024 is recessed below surface 1023 by an amount $T_2$. FIG. 10a shows a front view of the fixture 1015 mounted on surface 14. FIG. 10b shown a top view of fixture 1015. To avoid light reflections from the sides of the cavity formed within fixture 1015, the cavity sides may be sloped away from center as can be seen in FIG. 10b as 1031 and implied by the dotted lines 1027 denoting the hidden intersections of surface 1024 with the cavity walls. Light plane intersections 1022, 1021, 1026 provide completely analagous information as with 22, 21. 26 of fixture 15.

Figure 11:
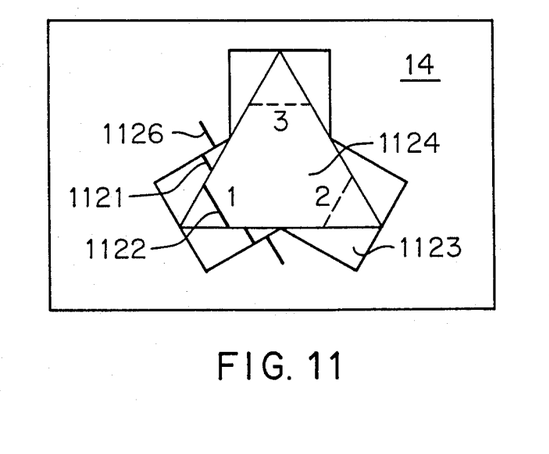
FIG. 11 shows a front view of a reference fixture comprising a triangular structure on a symmetrical base.

FIG. 11 illustrates that three measurements rather than four, can be used. Three sided surface 1124, preferably an equilateral triangle to simplify the mathematics and programming effort, is made to project in front of surface 1123, as in object 15, or be recessed as in object 1015. Light plane intersections 1122, 1121, 1126 provide analagous information as with 22, 21, 26 of fixture 15.

Figure 12:
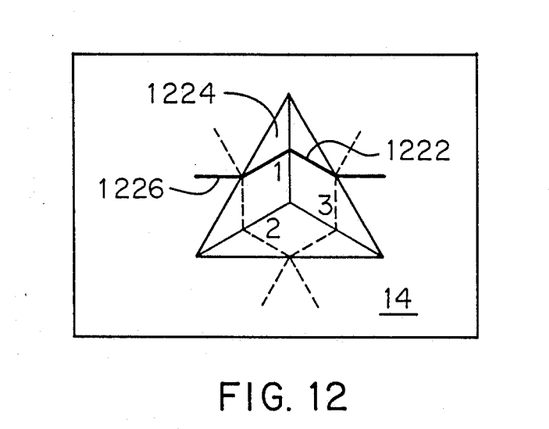
FIG. 12 shows a front view of a reference fixture comprising a three sided pyramid.

FIG. 12 illustrates that a three sided pyramid, either projecting outward or forming an inward cavity can be used as the reference fixture. Surface 1224 intersects with the light plane of the sensor to form segment 1222, and surface 14 intersects with the light plane to form segment 1226. The segments obtained in the other two required measurement orientations are shown dotted.

As can be seen from the few examples of reference objects, many shapes are useable. The only requirement is that unambiguous measurements be obtainable from the object (measurements that depend on the variables to be determined) and that those measurements be obtainable at more than one orientation. Symmetrical objects are preferable because simpler results are obtainable. Large changes in orientation can improve the ability to separate sensor and robot errors.

It should be appreciated that the symmetry of the sensor 11 between the light plane 20 and camera view 25 is not a factor in the application of this invention. In fact, the principles disclosed may be applied to any three dimensional measurement sensor, not just a single plane optical sensor, as shown. The invention relies only on the relative change in measurements as the sensor position is changed in a known way.

The alignment of the object 15 to the coordinate system is not critical, since the measurements can always be mathematically rotated to align the baseline to the coordinates. This isn't necessary, but makes processing clearly a subset of the aligned case.

However, placement of the object 15 can substantially facilitate the error cause determination. In FIG. 1 the placement is such that motions of the robot axes cause motions of sensor 11 along the principle axes of coordinate system 16. This serves to decouple an error attributable to an axis that causes a change that is predominantly in the x direction from an error attributable to an axis that causes a change that is predominantly in the z direction. It should be appreciated that placing object 15 as far as possible from an axis of rotation serves to increase the sensitivity with which a rotation error of that axis may be determined. Further, rotation errors become essentially translational errors at large distances from the rotating axis. This can be used to advantage to separate two rotational errors having parallel axes of causality, but where one axis is much closer to object 15 than the other.

The invention has been described and illustrated with reference to an exemplary embodiment. It is not to be considered limited thereto, inasmuch as all modifications and variations which might offer themselves are intended to be encompassed within the scope of the appended claims.

What is claimed is:

1. A method for determining robot positioning errors and sensor location errors, comprising the steps of: placing a reference object within a work volume of a robot carrying a sensor capable of making three dimensional measurements, said reference object having a symmetrical shape about an axis, said shape unambiguously defining location and orientation of said object for its small deviations relative to the robot position; measuring said reference object from a single predetermined robot position at fixed sensor orientations rotationally incremented about a robot axis that is substantially aligned to said axis of symmetry; recording said measurements in a memory, said measurements forming a baseline measurement set; repeating said measurement step at a later time and producing another measurement set; and processing said baseline set and said another measurement set to determine separately robot positioning errors and sensor location errors.

2. A method as defined in claim 1, wherein said reference object is a square block mounted on a second square block, said square block having its edges respectively parallel to the diagonals of said second square block.

3. A method as defined in claim 2, wherein the measurements are made in four 90 degree increments of sensor rotation.

4. The method as defined in claim 1 wherein said reference object is a square cavity located in a square block, said cavity having its edges respectively parallel to the diagonals of said square block.

5. A method as defined in claim 1, wherein said reference object is a four-sided pyramid mounted on a square block, said pyramid having its base edges respectively parallel to the diagonals of said square block.

6. A method as defined in claim 1, wherein said reference object is a three-sided pyramid mounted on a symmetric base.

7. A method as defined in claim 6, wherein the measurements are made in three 120 degree increments of sensor rotation.

8. A method as defined in claim 1, including the step of displaying separated robot and sensor errors that are determined for an operator to make corrections.

9. A method as defined in claim 1, wherein said robot is positioned with respect to said reference object such that motions of robot joints individually transform to sensor motions predominantly along one principal axis of the said reference object with minimum cross coupling between robot axes.

10. A method as defined in claim 1, wherein the robot is positioned with respect to said reference object such that one robot joint causing sensor motions in similar directions with another robot joint is located at the distance to said reference object that is substantially greater than the distance from said another robot joint to said reference object.

* * * * *